United States Patent
Davidsson (10) Patent No.: US 7,748,516 B2
(45) Date of Patent: Jul. 6, 2010

(54) CONSTRUCTION ELEMENT FOR A DEVICE FOR FORWARD FEEDING OF PRODUCT CARRIER AND A DEVICE COMPRISING SUCH A CONSTRUCTION ELEMENT

(75) Inventor: Inge Davidsson, Ganghester (SE)

(73) Assignee: Eton Systems AB, Ganghester (SE)

( * ) Notice: Subject to any disclaimer, the term of this patent is extended or adjusted under 35 U.S.C. 154(b) by 138 days.

(21) Appl. No.: 11/989,985

(22) PCT Filed: Aug. 4, 2006

(86) PCT No.: PCT/SE2006/000928

§ 371 (c)(1),
(2), (4) Date: Feb. 4, 2008

(87) PCT Pub. No.: WO2007/018462

PCT Pub. Date: Feb. 15, 2007

(65) Prior Publication Data

US 2009/0152075 A1    Jun. 18, 2009

(30) Foreign Application Priority Data

Aug. 5, 2005  (SE) .................................. 0501783

(51) Int. Cl.
*B65G 47/10* (2006.01)
(52) U.S. Cl. ................... 198/465.4; 198/685; 198/687
(58) Field of Classification Search ............. 198/465.4, 198/685, 686, 369.1, 369.5
See application file for complete search history.

(56) References Cited

U.S. PATENT DOCUMENTS

| | | | |
|---|---|---|---|
| 4,706,800 A | | 11/1987 | Davidsson |
| 5,398,598 A | * | 3/1995 | McFarlane et al. ........ 99/443 C |
| 5,660,114 A | | 8/1997 | Gruber |
| 5,788,056 A | * | 8/1998 | Clopton ...................... 198/779 |
| 6,269,944 B1 | * | 8/2001 | Taylor ...................... 198/860.2 |
| 6,279,735 B1 | * | 8/2001 | Davidsson et al. .......... 198/890 |
| 2004/0030442 A1 | * | 2/2004 | Speckhart et al. ........... 700/213 |
| 2004/0173438 A1 | * | 9/2004 | Ursitti ...................... 198/465.4 |
| 2004/0245073 A1 | * | 12/2004 | Hawk et al. .............. 198/678.1 |

OTHER PUBLICATIONS

PCT Application No. PCT/SE2006/000928, International Search Report mailed Nov. 13, 2006, 3 pgs.
PCT Application No. PCT/SE2006/000928, Written Opinion mailed Nov. 13, 2006, 5 pgs.

* cited by examiner

*Primary Examiner*—Mark A Deuble
(74) *Attorney, Agent, or Firm*—Schwegman, Lundberg & Woessner, P.A.

(57) ABSTRACT

Construction element for a device for forward feeding of product carriers (16), which construction element comprises a first beam section (14) presenting a main rail (15) intended to carry product carriers (16) movably resting on said main rail (15), a second beam section presenting a console intended to carry an endless belt (1) or chain, which is intended to contribute to the forward feeding of said product carrier (16), and guiding means (19) running along said main rail (15) intended to retain product carriers (16) on the main rail (15), and also a device for forward feeding of product carriers including such a construction element.

17 Claims, 6 Drawing Sheets

FIG. 6

CONSTRUCTION ELEMENT FOR A DEVICE FOR FORWARD FEEDING OF PRODUCT CARRIER AND A DEVICE COMPRISING SUCH A CONSTRUCTION ELEMENT

RELATED APPLICATION

This application is a nationalization under 35 U.S.C. 371 of PCT/SE2006/000928, filed Aug. 4, 2006 and published as WO 2007/018462 A1 on Feb. 15, 2007, which claimed priority under 35 U.S.C. 119 to Sweden Patent Application Serial No. 0501783-5, filed Aug. 5, 2005; which applications and publication are incorporated herein by reference and made a part hereof.

TECHNICAL FIELD

The present invention concerns a construction element in a device for forward feeding of product carriers being movably resting on a rail. Such devices are commonly known in textile factories, for example, for sewing shirts, wherein different pieces of cloth being hung up in a product carrier, which travels on a rail to a workstation, are to be sewn together at this workstation. The invention concerns not only manufacturing of shirts or the textile industry but is generally applicable for forward feeding of a product carrier. The invention especially concerns a construction element according to the preamble of claim 1. In a practical embodiment the construction element is made up from a straight beam that advantageously may be formed by a continuously cast profile.

BACKGROUND ART

Figure 1:
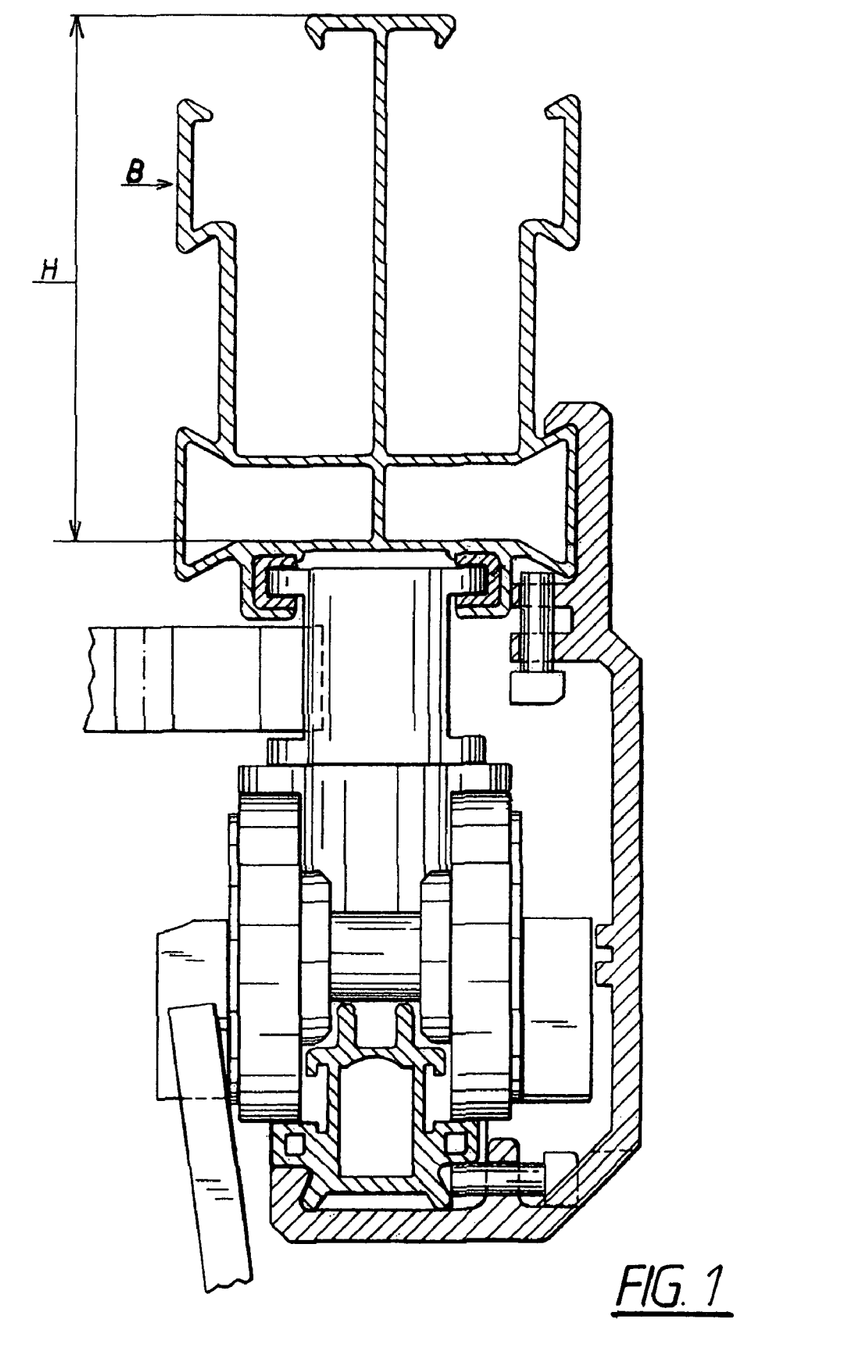
FIG. 1 shows a beam structure for a transport device according to prior art.

The present invention is a further development of the device for forward feeding of product carriers described in the Swedish patent SE 509402. The said document describes a device for forward feeding of product carriers movably resting on a main rail onto which branches are arranged for feeding product carriers in to and feeding product carriers out from the main rail. The product carriers are transported by an endless belt. Guiding means are used in order to ensure that the product carriers are securely transported along the main rail and to ensure that the product carriers do not derail from the main rail. In order for the product carrier to be able to be transported from the main rail to a feeding-out rail or from a feeding-in rail to the main rail, it is necessary that the guiding means allows that transfer is made at the branches of the feeding-in rail and the feeding-out rail respectively. In the embodiments of the device shown in SE 509402 that are on the market a beam profile is arranged, which integrally comprises the support surfaces of the main rail on which the product carrier rests during transport, and also the guiding means. The guiding means is formed as an upwardly protruding flange between the said support surfaces. The product carrier's wheels are placed on each side of the flange wherein derailing of the product carrier is hindered. When the branches have been arranged according to prior art, the beam profile with support surfaces and guiding rail has been cut and a switch device has been arranged for feeding in and feeding out. Since the guiding rail according to the prior art has been integrally formed with the main rail as part of one and the same beam, the beam forming both guiding rail and main rail has been cut at the position where a switch is to be arranged. As a consequence of the beam being cut, a transport device according to the prior art will be weakened in the area of the switch. In order to ensure to that there is enough bending stiffness for the supporting beam unit in the area of the switch, the transport device in accordance with prior art has been equipped with an upper load-bearing beam structure B presenting a relatively large height H in order to ensure that there is enough bending stiffness (see FIG. 1). The construction according to prior art also gives additional costs when a production flow shall be changed by further addition of switches being mounted to an existing track or in the case where the position of the switch has to be moved for any reason.

DISCLOSURE OF INVENTION

The object of the present invention is to obtain a construction element for a transport device where product carriers are transported in a track of an endless belt or chain, where the construction element allows flexible positioning of a branch, even after the transport device has been assembled.

The construction element according to the invention comprises a first beam section presenting a main rail intended to carry product carriers movably resting on said main rail, a second beam section presenting a console intended to carry a conveyer in the form of an endless belt or chain, said conveyer being intended to contribute to the forward feeding of said product carrier, and guiding means running along said main rail intended to detain product carriers on the main rail.

The object of the invention is met by a construction element according to the characterising portion of claim 1. By forming a guiding means running along the main rail so that it comprises a modularly constructed row of detachably attached guiding rail parts, the branch may be placed at an optional position by the removal of one or several guiding rail parts at an optional position along the construction element whereafter a switch may be arranged at the position where an interruption in the guiding means has been arranged.

Furthermore, the fact that no beam structure has to be cut means that the part of the construction element where the main rail is formed contributes to the bending stiffness of the construction element. This means that the height H of the support flange in an upper load-bearing beam structure B of the construction element may be made essentially lower than the corresponding design of the upper load-bearing beam structure according to prior art. In this way, the consumption of material becomes lower for the same demands regarding bending stiffness at the same time as the installation height becomes lower, which may give rise to reduced construction costs when suitable industry premises are built since correspondingly lower demands are met on ceiling height.

In a preferred embodiment of the invention the construction element comprises a third beam section to which said modularly constructed row of detachably attached guiding rail parts are mounted for the forming of said guiding means, where said third beam section defines a mounting section running along the construction element, where each of the individual guiding rail parts in the said modularly constructed row of detachably attached guiding rail parts may be placed at an optional mounting position within the mounting section.

The third beam section is preferably arranged in connection to the main rail of the first beam section so that the main rail is centred about the middle, in a crosswise direction to the longitudinal direction of the construction element, of a channel arranged in the said second beam section for carrying a chain or endless belt. The channel is formed of said console in the second beam section. Thus the support surface for carrying the product carriers may be formed with two support surfaces running along the longitudinal direction of the construction element with an intermediate zone where the said mounting section for the guiding rail parts is positioned.

A cross-section of the construction element suitably presents a first upper essentially horizontal part where the said channel for receiving the endless chain or belt is formed and a second lower essentially horizontal part where said main rail and mounting section are arranged. The cross-section of the construction element may further comprise an essentially vertical part that connects the upper essentially horizontal part with the lower essentially horizontal part. In a preferred embodiment of the invention the essentially vertical part, the upper essentially horizontal part and the lower essentially horizontal part form part of an extruded profiled beam.

According to the invention the guiding means comprises a modularly constructed row of detachably attached guiding rail parts. Due to the modularly constructed row of guiding rail parts being detachably attached to the construction element and since they may be positioned at an optional mounting position, the guiding rail parts may be removed at an optional position in order for a branch to be formed. A branch may thus be arranged on every mounting position without having to cut the main rail. In order to obtain a good support for the product carriers without too many joints the main rail with its support surface for product carriers is preferably continuously arranged along the entire length of the construction element. The mounting section for the modularly constructed row of detachably attached guiding rail parts and the said main rail is preferably integrally formed as two separate sections in one and the same beam material. The modularly constructed row of detachably attached guiding rail parts may thus be attached by placing guiding rail parts along the said main rail on mounting positions according the above.

The term a modularly constructed row of detachably attached guiding rail parts is intended to mean that the guiding means is built from a number of detachable guide rail parts along the main rail. By placing the guiding rail parts with a space between at a desired position, an interruption for arrangement of a branch may be supplied at the desired position. In the case where no branch is desired within a construction element, the row of guiding rail parts is unbroken without spaces.

In a preferred embodiment, all the guiding rail parts have the length unit a unit length L and switches have a length that corresponds to an integer multiple, for example 3 L. In order to arrange a space for a branch, three guiding rail parts thus have to be removed at an optional position and a switch is arranged in their place. If the mounting section of the construction element has the length 10 L and the switch has 3 L, the switch accordingly may be placed at 8 different positions by rearrangement of the guiding rail parts at suitable positions. The guide rail parts may be formed in different lengths, for example with the lengths 1, 2, 3 and 5 L. The guiding rail parts are advantageously formed with the length unit 1 L for all guiding rail parts except for the guiding rail parts that comprise an active means, where the length of the guiding rail parts with the active means is adapted to a suitable integer multiple of the length unit L dependent on the requirement from the active means. A suitable length of the length unit L is 1-3 dm, advantageously 1 dm.

The guiding rail parts are advantageously mounted in a channel running in the longitudinal direction of the construction element, where the channel presents a bottom surface and side surfaces positioned on each side of the bottom surface respectively. Mounting notches for guiding rail parts and switches are arranged in the channel, for example in the bottom surface for receiving fixing means arranged on guiding rail parts and, where appropriate, on the switch or the switches. The set of mounting positions needed for attaching the guiding rail parts and switch, or switches where appropriate, are supplied preferably by the bottom surface in the channel presenting a row of equidistant notches arranged to receive protrusions being part of the said guiding rail parts and/or switch for fixation of said rail parts and/or switch in the longitudinal direction of the construction element. Advantageously, the same mounting notches are used for guiding rail parts and switches.

The invention also concerns a transport device, said transport device comprising a set of construction elements according to the invention, a set of product carriers and an endless belt or chain arranged to transport the said product carriers, where said construction elements each comprise a main rail and guiding means running along the said main rail intended to detain product carriers on the main rail, where branches are arranged to the main rail for feeding product carriers in to and feeding product carriers out from the main rail and where the said guiding means presents interruptions in connection to said branches wherein the feeding in of product carriers to the main rail from a feeding-in rail and the feeding out of product carriers from the main rail to a feeding-out rail is allowed at the said interruption.

BRIEF DESCRIPTION OF DRAWINGS

The invention will be described in further detail below, with reference to the attached drawings, in which.

EMBODIMENT(S) OF THE INVENTION

Figure 2:
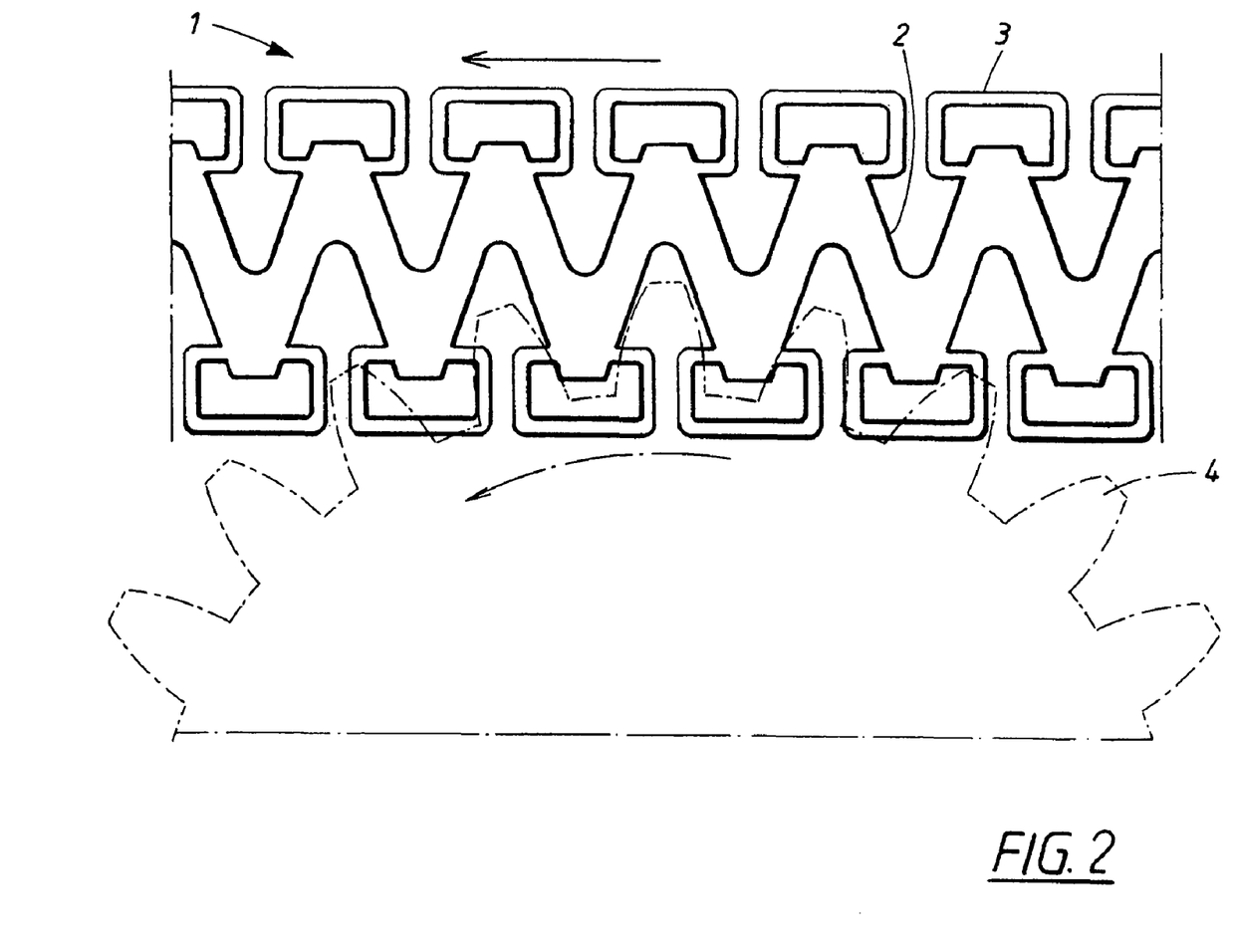
FIG. 2 shows a section taken through the drive belt according to the invention with a driving gearwheel.

FIG. 2 shows a section through the drive belt 1 comprising a pleated belt 2. The belt is advantageously made from a plastic that makes the belt bendable in all directions, and that makes it possible for the band to be pulled forward, but also pushed forward. In the figure a gear wheel 4 is also shown that drives the belt forward. The construction of this driving belt is described further in the British patent document 2105284, but is in the present case modified by being made in one piece and provided with bosses 3 being a flange for suspension in a sliding ledge. Even though the use of a drive belt according to the above is a preferred embodiment, the invention may be used with drive belts and chains of a different conventional kind.

Figure 3:
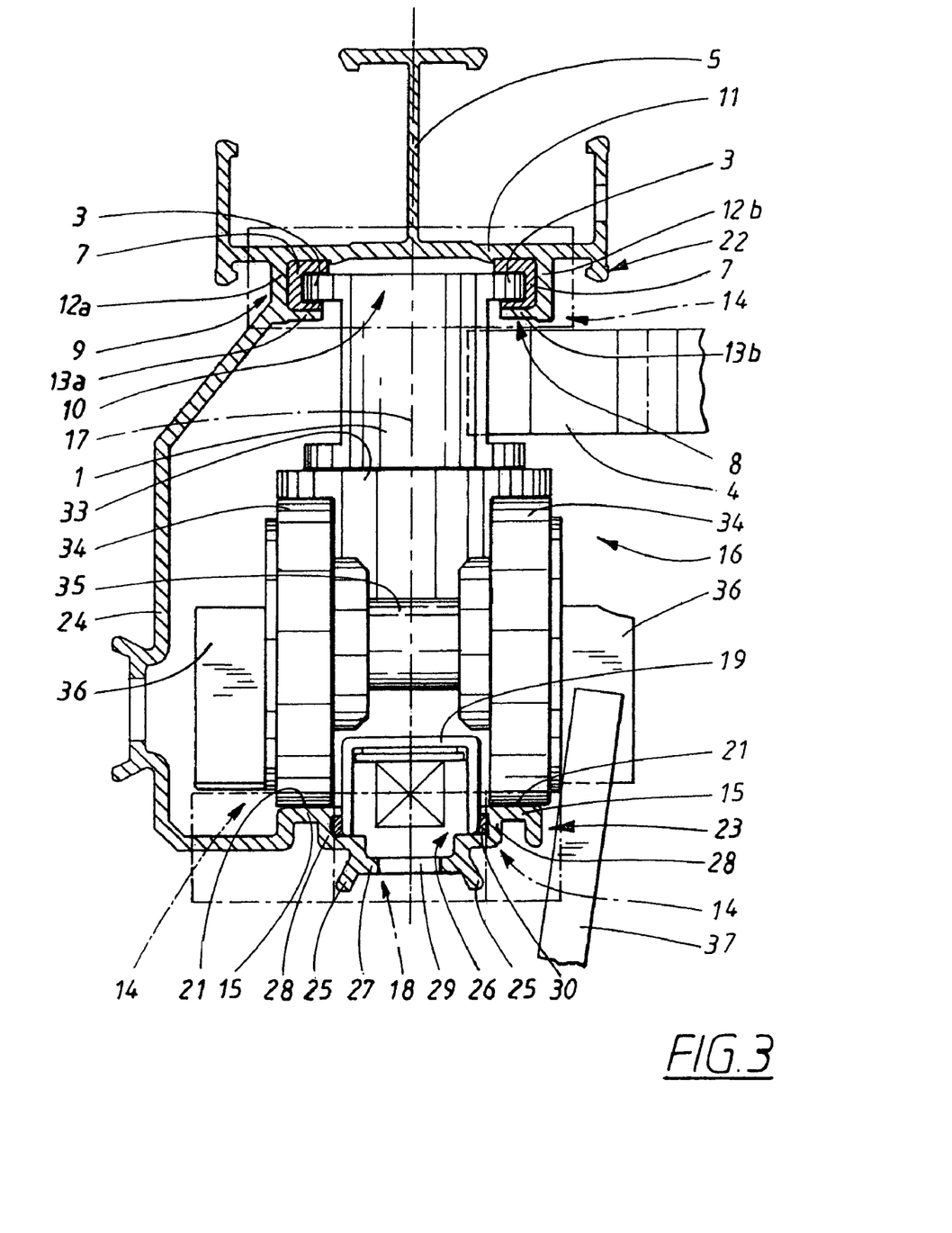
FIG. 3 partly in section showing the main transport line with driving belt, main rail, product carrier and driver.

In FIG. 3 a section of a construction element according to the invention is shown, where the belt 1 is suspended in a support 5. The belt 1 is provided with bosses 3 brought into sliding ledges 7 so that the band easily may be brought forward or backward. In the figure it is indicated how a gear wheel 4 engages the band 1 and drives it. The sliding ledges 7 are attached in a second beam section 8 presenting a console 9 in which a channel 10 is formed intended to carry the endless belt or chain 1. The second beam section 8 is in the form of an essentially horizontal part comprising a horizontal upper wall 11 and two downwardly protruding protrusions 12a, 12b positioned at a certain distance. In the end part of the protrusions 12a, 12b facing away from the said upper wall 11, horizontal protrusions 13a, 13b are arranged so that they extend towards each other. The channel for carrying an endless conveyer in the form of a chain or belt is delimited by the horizontal upper wall 11, the downwardly protruding protrusions 12a, 12b and the horizontal protrusions 13a, 13b extending towards each other. The end parts of the horizontal protrusions 13a, 13b extending towards each other are positioned at a distance from each other in order to form an opening where parts of the chain are accessible or are allowed to protrude wherein carrier means attached to the chain or belt may be driven by the same. The drive belt is formed so that it may be utilized as a power supply anywhere along the entire length of the belt.

In the bottom part of the figure is shown a first beam section 14 in which a main rail 15 is formed intended to carry the product carrier 16 movably resting on the main rail 15. The main rail 15 is centred about the middle 17 of the channel 10 in a crosswise direction to the longitudinal direction of the construction element. In the figure a third beam section 18 is shown to which the modularly constructed row of detachably attached guiding rail parts 19 is mounted to the form the said guiding means. The third beam section 18 defines a mounting section 20 running along the said construction element (see FIG. 3), where each of the individually guiding rail parts in the said modularly constructed row of detachably attached guiding rail parts may be placed at an optional position within the said mounting section 20.

The first, second, and third beam sections have been marked by broken line frames surrounding the sections. Each section is formed from that part of the beam that lies within each frame.

The construction element thus comprises a first beam section forming a console for a conveyer, a second beam section onto which support surfaces 21 for product carriers are formed and a third beam section forming a mounting section for detachable attachment of a modularly constructed row of guiding rail parts 19. The first, second and third beam sections are all preferably formed as separate parts in the same beam material. The construction element may also comprise a fourth beam section serving as console part for mounting of the construction element to a supporting structure.

The construction element in the embodiment shown in FIG. 3 presents a first upper essentially horizontal part 22 where the said channel 10 for receiving the endless chain or belt is formed and a second lower essentially horizontal part 23 where the said main rail 15 and mounting section 20 are formed. The upper essentially horizontal part 22 thus comprises the second beam section 8. The lower essentially horizontal part 23 thus comprises the first and third beam sections 14, 18. The cross-section of the construction element further presents a vertical part 24 that connects the upper essentially horizontal part with the lower essentially horizontal part.

The main rail 15 thus presents two longitudinally extending support surfaces 21 with an intermediate zone 25 where a mounting zone 20 for a modularly constructed row of detachably attached guiding rail parts 19 is arranged.

The intermediate zone 25 forms a channel 26 running in the longitudinal direction of the construction element, where the channel 26 presents a bottom surface 27 and side surfaces 28 positioned on each side of the bottom surface respectively. The channel presents mounting notches 29 in the bottom surface 27 of the channel. The mounting notches 29 are arranged for the reception of fixing means arranged on guiding rail parts and, where appropriate, on the switch or the switches. The mounting notches 29 advantageously comprise a row of equidistant notches on the said bottom surface of the channel arranged to receive protrusions being arranged on a bottom part of the said guiding rail parts and/or switch for fixation of said rail parts and/or switch in the longitudinal direction of the construction element. In order to fixate the guiding rail parts 19 in the channel, the channel may be formed with a horizontally running groove 30 arranged in the side walls of the channel. The groove 30 may then be arranged to receive protrusions in the guiding rail part or the switch which may be snapped into place in the groove for detachable locking of the guiding rail part in a vertical direction with reference to the bottom surface.

As shown in the figure, the belt 1 hangs downwardly and carries at its lower end a number of interspaced drivers 33. These drivers 33 being attached to the belt 1 constitute a box-shaped structure being intended to push against the product carrier 16.

The product carrier 16, which is known and does not form part of the invention, consists of two wheels 34 held together by an axis 35 and by two wings 36 extending out from the hub. The wheels 34 are intended to roll on the support surfaces 21 of the main rail and to be controlled by the guiding means.

On one of the wings 36 a bar 37 is arranged that has a gripping means arranged at its lower end for attachment of, for example, pieces of cloth.

The driver 33, which is attached on the drive belt 1 drives the product carriers 16 by pushing them forward against the wheels 34. The support 5 may be fixedly secured in a beam or another supporting structure.

Figure 4:
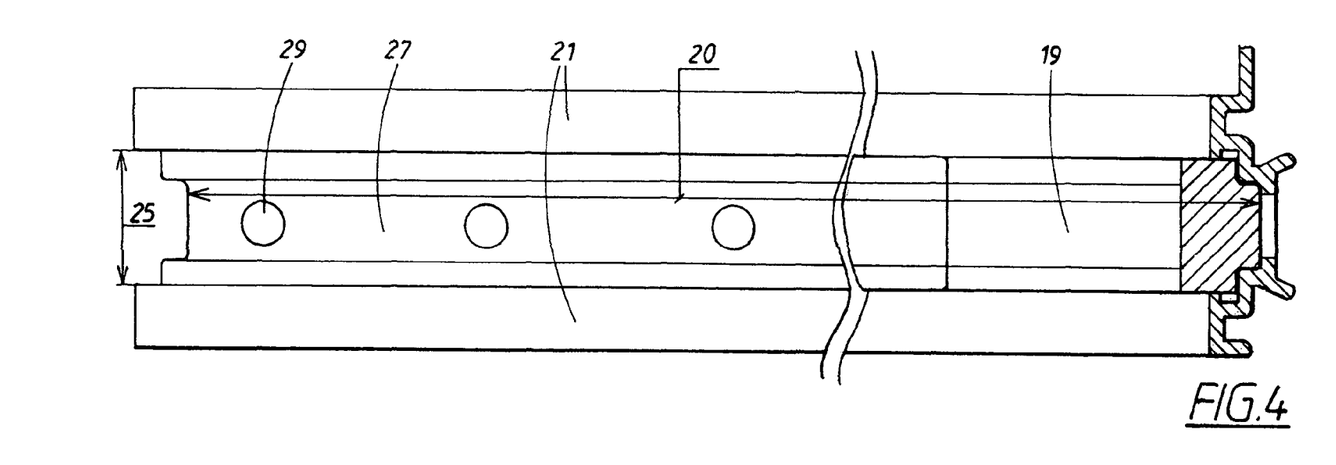
FIG. 4 shows a mounting section for receiving a modularly constructed row of detachably attached guiding rail parts.
Figure 5:
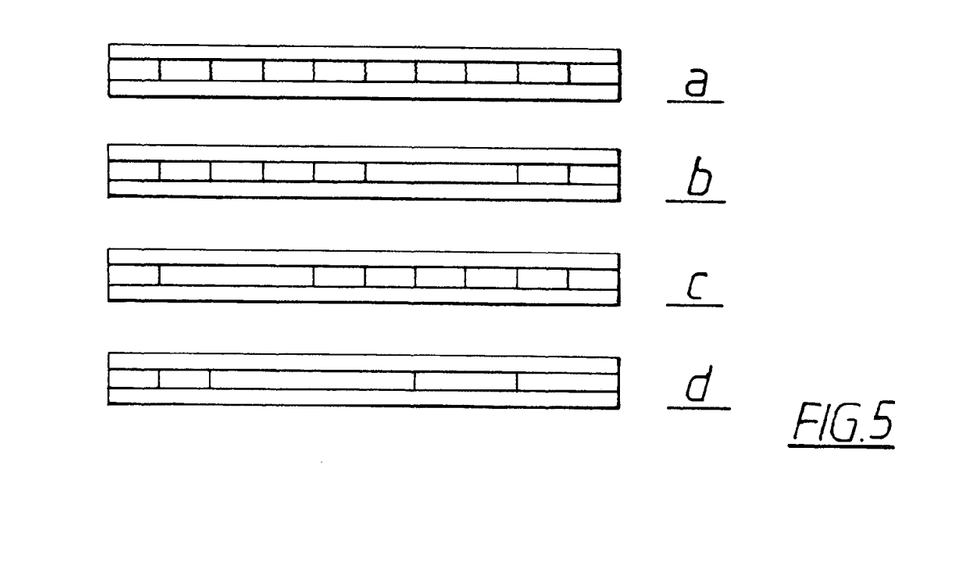
FIGS. 5a-d show different examples of modularly constructed row of detachably attached guiding rail parts.

In FIG. 4 the first beam section 14 is shown with two parallel extending support surfaces 21 and the third beam section 18 with a mounting section 20 for receiving a modularly constructed row of detachably attached guiding rail parts 19 from above. The mounting section is in the preferred embodiment formed as a channel 26 with a bottom surface 27. The figure shows equidistant mounting notches 29 intended to receive protrusions formed on guiding rail parts or switches. From the figure it is apparent that the main rail 15 with support surfaces for product carriers is continuously formed along the entire length of the construction element and that the said modularly constructed row of detachably attached guiding rail parts are detachably attached along the main rail.

FIGS. 5a-d show various examples of a modularly constructed row of detachably attached guiding rail parts. Fig. a shows a modularly constructed row comprising only guiding rail parts with the length unit 1 L. In figure c the guiding rail means nos 2-4 from the left have been replaced by a switch with the length unit 3 L. In figure b the guiding rail parts nos 6-8 from the left have been replaced by a switch with the length unit 3 L. Fig. d shows a modularly constructed row including only guiding rail parts with length unit 1 L, 1 L, 4 L, 2 L and 2 L from the left in the figure. The figure symbolically shows not only that it is possible to form a modularly constructed row of guiding rail parts in which all guiding rail parts have the same length, but also that it is possible to form guiding rail parts of different lengths. The invention is however characterised by the principle that a switch may be placed on an optional mounting position by removing a necessary number of guiding rail parts. In figure b a switch has been placed in positions 6-8 and in figure c the switch has been positioned in positions 2-4.

Figure 6:
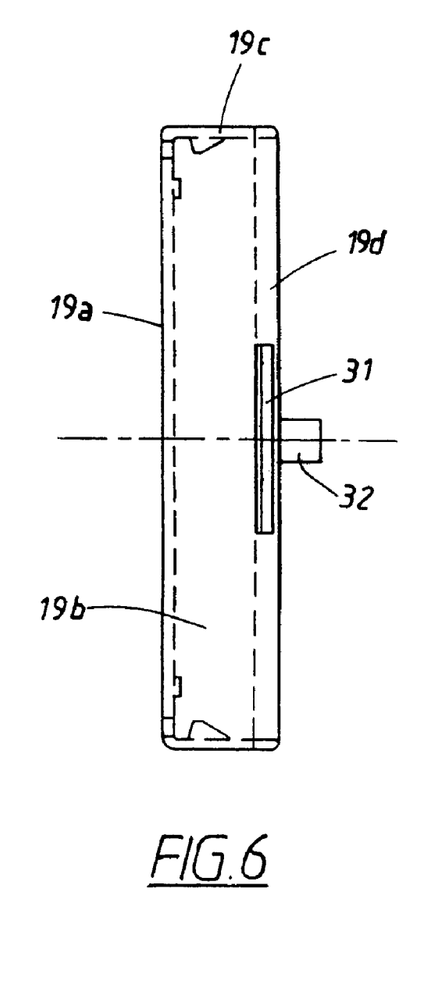
FIG. 6 shows a side view of a guiding rail part.
Figure 7:
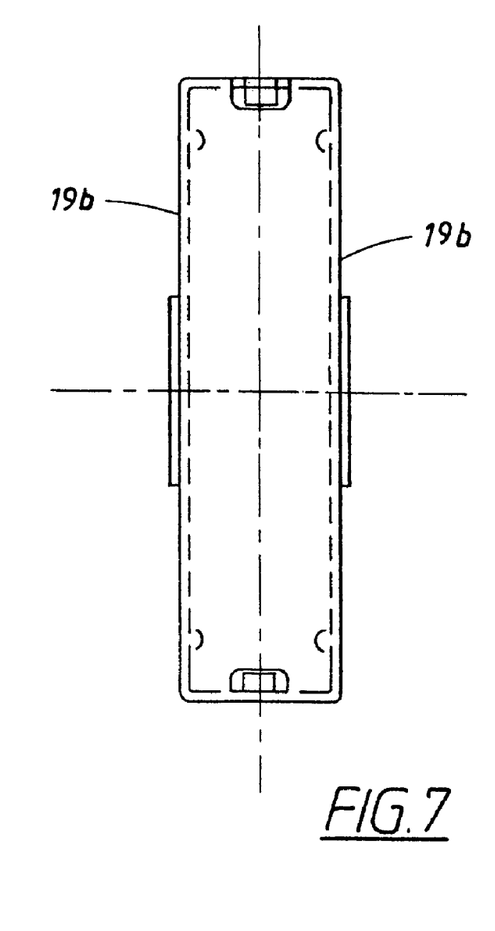
FIG. 7 shows a top view of a guiding rail part.

FIG. 6 shows a guiding rail part seen from the side and in FIG. 7 the same guiding rail part is shown from above. The guiding rail part 19 is in principle formed as a rectangular parallelepiped (cuboid) with an upper smooth surface 19a, two lengthwise extending side surfaces 19b and two crosswise extending side surfaces 19c. The lengthwise extending side surfaces present a lower part 19d adapted to lie against the side surfaces 28 of the channel 26. In order to fixate the guiding rail part in the channel 26 the guiding rail part may be arranged with a protrusion 31 which may be resiliently snapped into the groove 30 in the side walls 28 of the channel. On the underside of the guiding rail part a protrusion 32 is arranged, which is intended to engage a mounting notch 29.

Figure 8:
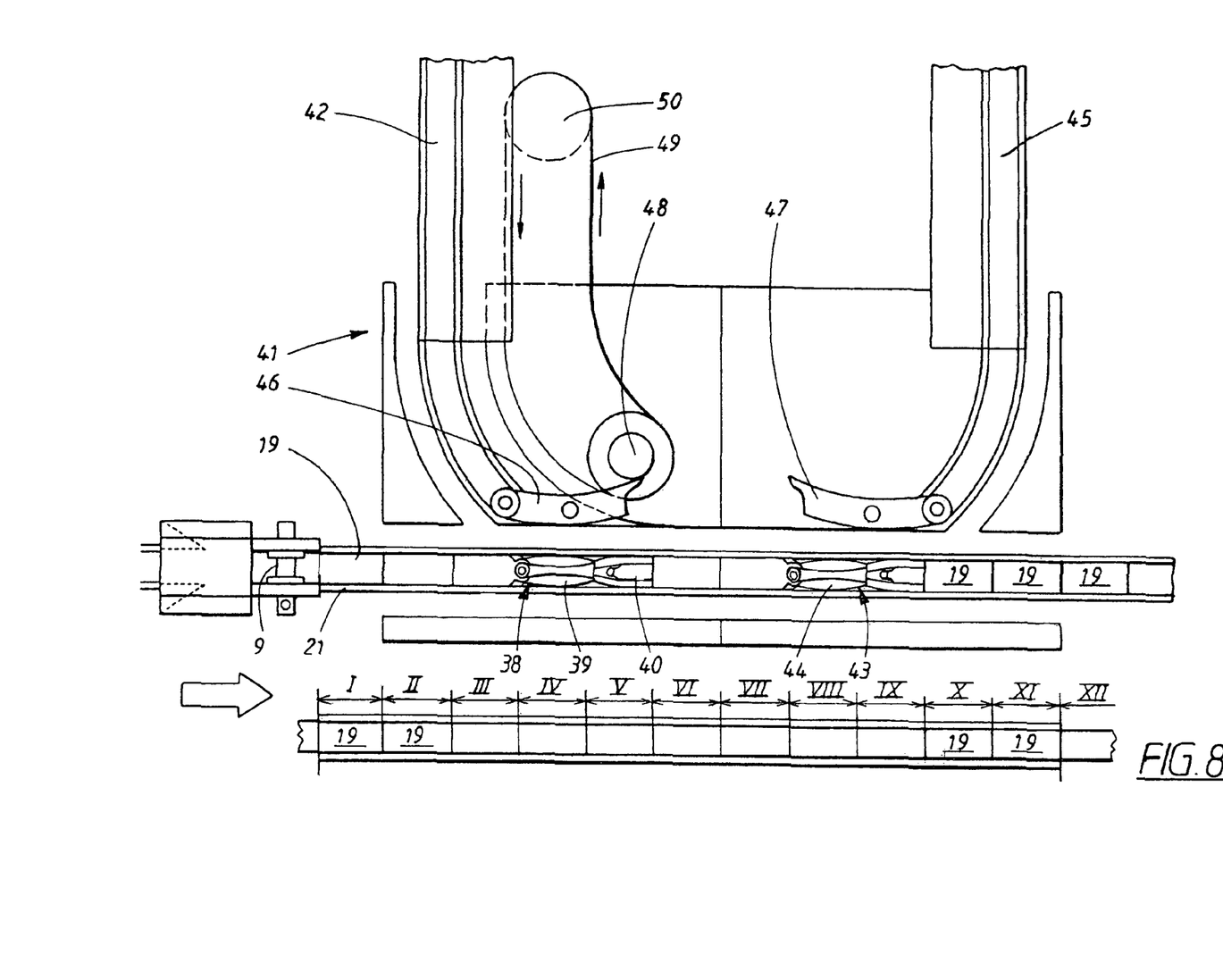
FIG. 8 shows the main rail with branching chains seen from above.

FIG. 8 shows how the branches to and from the main line are arranged. The main rail 15 runs uninterrupted past the coupling stations. A modularly constructed row of guiding rail parts 19 are arranged along the main rail 15 which are placed in the positions I, II, VI, X, XI and XII of the mounting section 20. In the mounting section switch parts have been placed in positions III-V and VII-IX. A first switch means 38 with a pivotable intermediate portion 39 and a fixed intermediate portion 40 has been placed in the positions III-V. The first switch means 38 is placed in the channel 26 that has been selected to receive guiding rail parts in positions III-V. The first switch means 38 is arranged to cooperate with feeding-in means 41 arranged to a feeding-in rail 42. No guiding rail parts are however mounted into these positions (III-V) when the first switch means 38 and the feeding-in rail are arranged. In the case where the feeding-in rail no longer is needed the first switch means 38 may be removed from the mounting positions III-V and may thereafter be replaced by guiding rail parts which are mounted into these positions. It is thus possible to connect further feeding-in rails or to remove existing mounting rails in an easy fashion without having to perform destructive measures to the main rail. The figure shows a second switch means 43 attached in positions VII-IX. The second switch means comprises a pivotable intermediate portion 44. The feeding-in rail to the main rail 15 is denoted 42 and the feeding-out rail with 45. At the end of the feeding-in rail is A pivotable end piece 46 and at the front end of the feeding-out rail 45 there is a pivotable end piece 47. A driving wheel 48 is arranged adjacent the main rail for driving of an endless belt 49 that has a driver for driving of product carriers on the feeding-in rail 42 up to the main rail 15. The endless belt 49 runs about a free wheel 50 or a sliding ledge.

In the position shown in FIG. 7 there is a driver 33 on the belt 1 on the way to the right in the figure and pushing a product carrier 16 in front of itself. It is apparent from the figure that the driver 33 and the product carrier 16 will go straight to the right since the pivotable parts 46 and 47 are swung to the side and the pivotable parts 39 and 44 on the switch means 38 and 43 connect both ends of it.

The invention claimed is:

1. A construction element for a device for forward feeding of product carriers, which construction element comprises a first beam section presenting a main rail intended to carry product carriers movably resting on said main rail, a second beam section presenting a console to carry an endless belt or chain, which is intended to contribute to the forward feeding of said product carrier, and a guide running along said main rail to retain product carriers on the main rail wherein the guide comprises a modularly constructed row of detachably attached guiding rail parts,
wherein said construction element comprises a third beam section to which said modularly constructed row of detachably attached guiding rail parts are mounted for the forming of said guide, where said third beam section defines a mounting section running along the construction element, wherein said mounting section each of the individual guiding rail parts in the said modularly constructed row of detachably attached guiding rail parts may be placed at an optional mounting position, and
wherein each mounting position includes a length that is a characteristic length for said row of guiding rail parts and where a length of said switch displays a length that constitutes an integer multiple of said length unit.

2. A construction element in accordance with claim 1, wherein the guide includes an interruption for arranging branches where a product carrier is allowed to leave or join the main rail can be achieved at any position within said mounting section by refraining from mounting one or more guiding rail parts on the mounting position.

3. A construction element in accordance with claim 2, wherein the mounting section running along said construction element presents a predetermined number of mounting positions.

4. A construction element in accordance with claim 2, comprising one or more switches mounted on said mounting section, the switches being arranged to allow passage of a product carrier along said main rail past said branch and also to allow transport of the product carrier from said main rail to a feeding out rail, or alternatively from a feeding in rail to the main rail and in that guiding rail parts are mounted on remaining mounting positions.

5. A construction element in accordance with claim 1, wherein one or several of the guiding rail parts comprises an active structure, such as a scanner or a barrier unit.

6. A construction element in accordance with claim 1, wherein the length of at least one of said guiding rail parts is constituted by one length unit.

7. A construction element in accordance with claim 6, wherein all guiding rail parts except for the guiding rail parts that comprise an active structure display a length amounting to one length unit.

8. A construction element in accordance with claim 6, wherein all guiding rail parts including the guiding rail parts that comprise an active structure display a length amounting to one length unit.

9. A construction element in accordance with claim 1, wherein said console forms a channel, in which said chain or belt is intended to be placed, that said main rail, which forms a support surface for a product carrier faces towards said console.

10. A construction element in accordance with claim 9, wherein said main rail is centered about the middle of the channel in a crosswise direction to the longitudinal direction of the construction element, wherein said support surface is divided into two longitudinal support surfaces with an intermediate zone where the said mounting section is positioned.

11. A construction element in accordance with claim 10, wherein a cross-section of the construction element presents a first upper essentially horizontal part where the channel for receiving the endless chain or belt is formed and a second lower essentially horizontal part where said main rail and mounting section are arranged.

12. A construction element in accordance with claim 11, wherein a cross-section of the construction element comprises an essentially vertical part that connects the upper essentially horizontal part with the lower essentially horizontal part.

13. A construction element in accordance with claim 11, wherein the essentially vertical part, the upper essentially horizontal part and the lower essentially horizontal part form part of an extruded profiled beam.

14. A construction element in accordance with claim 9, wherein an intermediate zone forms a channel running in the longitudinal direction of the construction element, where the channel presents a bottom surface and side surfaces positioned on each side of the bottom surface, that mounting notches are arranged in said bottom surface for the reception of a fixture arranged on guiding rail parts and, where appropriate, on the switch or the switches.

15. A construction element in accordance with claim 14, wherein said mounting notches comprise a row of equidistant notches on said bottom surface arranged to receive protrusions being arranged on a bottom part of said guiding rail parts and/or switch for fixation of rail parts and/or switch in the longitudinal direction of the construction element.

16. A construction element in accordance with claim 1, wherein said main rail with support surfaces for product carriers is continuously formed along the entire length of the construction element, and said modularly constructed row of detachably attached guiding rail parts are detachably attached along said main rail.

17. A device for forward feeding of product carriers comprising a set of construction elements in accordance with claim 1, a set of product carriers and an endless belt or chain arranged to transport the said product carriers, where said construction elements each comprise a main rail and a guide running along said main rail intended to detain product carriers on the main rail, where branches are arranged to the main rail for feeding product carriers in to and feeding product carriers out from the main rail and where said guide presents interruptions in connection to said branches wherein the feeding in of product carriers to the main rail from a feeding-in rail and the feeding out of product carriers from the main rail to a feeding-out rail is allowed at said interruption.

* * * * *